United States Patent [19]

Tsuchiya et al.

[11] Patent Number: 4,743,118
[45] Date of Patent: May 10, 1988

[54] METHOD OF DETECTING ORIGIN OF SHEAR AND MEASURING AMOUNT OF SHEAR IN SHEARING INTERFEROMETER SYSTEMS

[75] Inventors: Keishin Tsuchiya; Junichi Kitabayashi; Toshio Kanoh, all of Tokyo, all of Japan

[73] Assignee: Ricoh Company, Ltd., Tokyo, Japan

[21] Appl. No.: 846,115

[22] Filed: Mar. 31, 1986

[30] Foreign Application Priority Data

Apr. 4, 1985 [JP] Japan ................................ 60-071280
Apr. 22, 1985 [JP] Japan ................................ 60-086042
May 2, 1985 [JP] Japan ................................ 60-094977

[51] Int. Cl.$^4$ ............................................... G01B 9/02
[52] U.S. Cl. ..................................... 356/353; 356/360
[58] Field of Search ........................ 356/353, 359, 360

[56] References Cited

U.S. PATENT DOCUMENTS

| | | | |
|---|---|---|---|
| 4,575,248 | 3/1986 | Horwitz et al. | 356/353 |
| 4,643,576 | 2/1987 | Kanoh | 356/353 |
| 4,645,346 | 2/1987 | Fontanella | 356/353 |
| 4,653,923 | 3/1987 | Kitaboyashi | 356/360 |

Primary Examiner—Davis L. Willis
Assistant Examiner—Matthew W. Koren
Attorney, Agent, or Firm—Oblon, Fisher, Spivak, McClelland & Maier

[57] ABSTRACT

A method of measuring the origin and amount of a shear between a basic light beam and a reference light beam in a shearing interferometric system. To detect the shear origin, shutters are disposed respectively in the optical paths of the basic and reference light beams. The basic and reference light beams are guided through a condenser lens toward a four-segment light detector. First, the optical path of the reference light beam is closed to allow only the basic light beam to fall on the four-segment light detector. By adjusting the position of the light detector, the position of the basic light beam is identified. Then, the optical path of the basic light beam is closed to allow only the reference light beam to reach the light detector. While output signals from the light detector are being monitored, a shearing member is displaced to shift the reference light beam to detect the shear origin in which the reference and basic light beams are overlapped. To measure the shear amount, light of a plane wave is used as the basic light beam, and the basic and reference light beams caused by an imaging lens to fall on an area sensor are of plane wavefronts. An interference fringe pattern on the area sensor is measured by a fringe scanning process to determine an angle at which the wavefronts of the basic and reference light beams are inclined to each other. The shear amount is computed from the determined angle and the focal length of the imaging lens.

7 Claims, 6 Drawing Sheets

F I G. 1
(I)
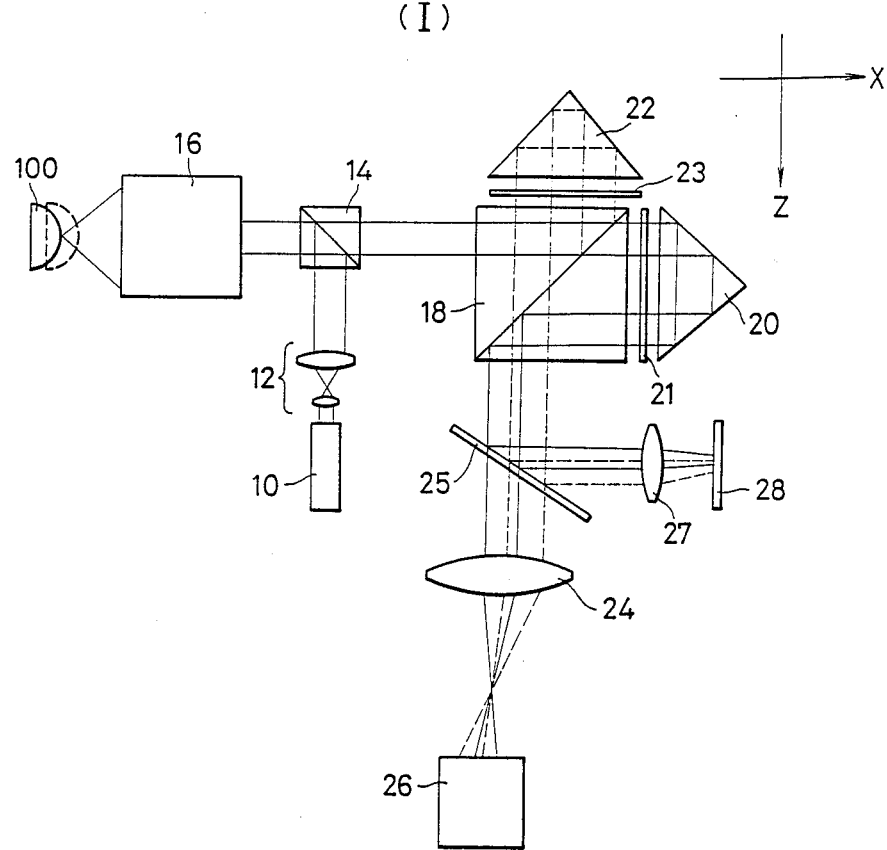
(II)
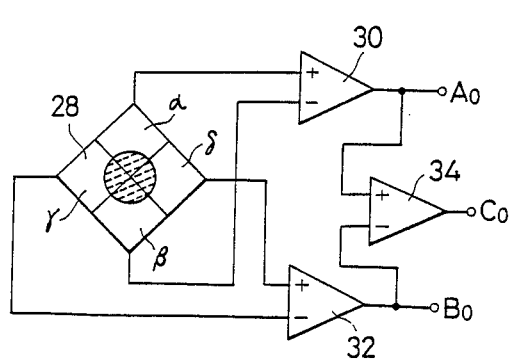
(III)
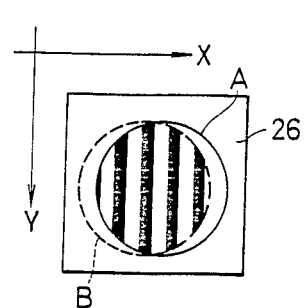

(I)

(II)

(III)

METHOD OF DETECTING ORIGIN OF SHEAR AND MEASURING AMOUNT OF SHEAR IN SHEARING INTERFEROMETER SYSTEMS

BACKGROUND OF THE INVENTION

1. Field of the Invention

The present invention relates to a method of detecting the origin of a shear and measuring the amount of a shear in a shearing interferometer system.

2. Discussion of Background

The shearing interferometric system is known as a system for measuring with high accuracy the surface configuration of an object and the performance of a lens. In this system, light bearing information about an object being measured, such as light reflected from a surface of an object being measured or light that has passed through a lens being checked for its performance, is referred to as measuring light.

The measuring light is divided into a basic light beam and a reference light beam which is laterally shifted with respect to the basic light beam. The interval by which these light beams are laterally shifted with respect to each other is referred to a shear.

The two light beams are equivalent to each other and have the same wavefront. For the sake of simplicity, one-dimensional measuring principles will be described below. Assuming that the wavefront shape of the basic light beam on an area sensor is expressed by $W(x)$, the wavefront shape of the reference light beam on the area sensor is expressed by $W(x+S)$ due to the shear S. Since the shear S is generally quite small, the difference between the wavefronts $W(x+S) - W(x)$ becomes:

$$\frac{dW(x)}{dx} \cdot S,$$

and can be expressed as $\Delta W(x).S$ if $$\frac{dW(x)}{dx} = \Delta W(x).$$

The value $W(x)$ can be known with high accuracy by measuring and analyzing the interference fringe pattern of two light beams in a known fringe scanning interferometric system. By effecting an arithmetic operation:

$$W(x) = \frac{1}{S} \int \Delta W(x) dx \quad (1)$$

the wavefront shape $W(x)$ can be determined. Then, the wavefront shape is corrected on the basis of a correlationship between the wavefront shape and the configuration or the like of the surface being measured, so that the surface configuration can be identified. Information on the performance of a lens can be obtained from the wavefront shape thus determined.

In order to effect accurate measurements in the shearing interferometric system, therefore, the righthand side of the above equation (1) must be accurately computed. The accuracy of the righthand side of the equation (1) is directly affected by the shear S, and hence the accuracy of the shearing interferometric system itself is largely dependent on the accuracy of the shear S. For sufficient measuring accuracy, the accuracy of the shear S should preferably be kept to 0.1 micrometer. Since the shear S is a shift between the reference light beam and the light beam shifted therefrom, it is necessary that the condition in which no shear is present, i.e., the origin of the shear be accurately be measured for exact determination of the shear.

Heretofore, the origin of a shear has been detected in the following manner: In the origin of a shear, the basic and reference light beams are completely overlapped with no phase difference, and hence there is no interference fringe formed on an area sensor. Therefore, it has been customary to display the interference fringe on a CRT based on the output signal from the area sensor and adjust the shear to zero while monitoring the displayed interference fringe for detecting the shear origin.

However, the conventional practice is not necessarily easy to perform, and the detection accuracy is largely governed by the experience and skill of the operator.

It would be convenient if the shear S could be measured directly with high accuracy.

SUMMARY OF THE INVENTION

It is therefore an object of the present invention to provide a method of easily and reliably detecting the origin of a shear in a shearing interferometric system.

Another object of the present invention is to provide a method of measuring the amount of a shear highly accurately in shearing interforometric system.

A method of detecting the origin of a shear is effected as follows:

First, shutters are provided respectively in the optical paths of basic and reference light beams, and then the basic and reference light beams that have traveled parallel to each other are converged toward a convergent point with a condenser lens. Thereafter, a four-segment light detector is provided in a position slightly displaced from the convergent point in the direction of the optical axis, the light detector being movable in a plane normal to the optical axis. For detecting the shear origin, the optical path of the reference light beam is closed by the shutter disposed therein to allow only the basic light beam to fall on the light detector. The light detector is displaced in the plane while the output signals from the light detector are being monitored until the light detector is positioned so that said the light beam falls on the center of the light detector. Then the optical path of the basic light beam is closed by the shutter disposed therein and the optical path of the reference light beam is opened to allow only the reference light beam to fall on the light detector. A shearing member is displaced to shear the reference light beam while the output signals from the light detector are being monitored until the reference light beam falls on the center of the light detector.

A method of measuring the amount of a shear is carried out as follows:

A plane mirror, first and second shutters, and an optical path separation member are added to a shearing interferometric system.

The optical path separation member comprises a half-silvered mirror or a beam splitter. It may be newly added or one employed in the shearing interferometric system may be used as the optical path separation member.

The optical path separation member is disposed before a converter lens on an illuminating optical path for guiding parallel-ray light to illuminate an object to be measured. A portion of the illuminating light traveling toward the converter lens is separated by the optical path separation member to fall on the plane mirror, which has a mirror surface of a highly flat finish.

A first shutter is disposed between the separation point of the optical path separation member and the converter lens, and a second shutter is disposed bewteen the separation point and the plane mirror.

When measuring the amount of a shear, the first shutter is closed and the second shutter is opened to allow parallel-ray light to fall on the plane mirror, and light reflected from the plane mirror is guided as measuring light to travel along a shearing interferometric optical path toward an area sensor. Before the measuring light reaches the area sensor, it is divided into a basic light beam and a reference light beam, which is laterally shifted with respect to the basic light beam.

As a result, an interference fringe pattern on the area sensor is measured by a fringe scanning process to analytically determine an angle $\theta$ at which the wavefront of the basic light beam and the wavefront of the reference light beam are inclined to each other. The amount of a shear S is computed according to $S = f \cdot \tan \theta$ where f is the focal length of an imaging lens that causes the light beams to fall on the area sensor.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a schematic view showing a method of detecting the origin of a shear in a shearing interferometric system;

DESCRIPTION OF THE PREFERRED EMBODIMENT

Figure 2:
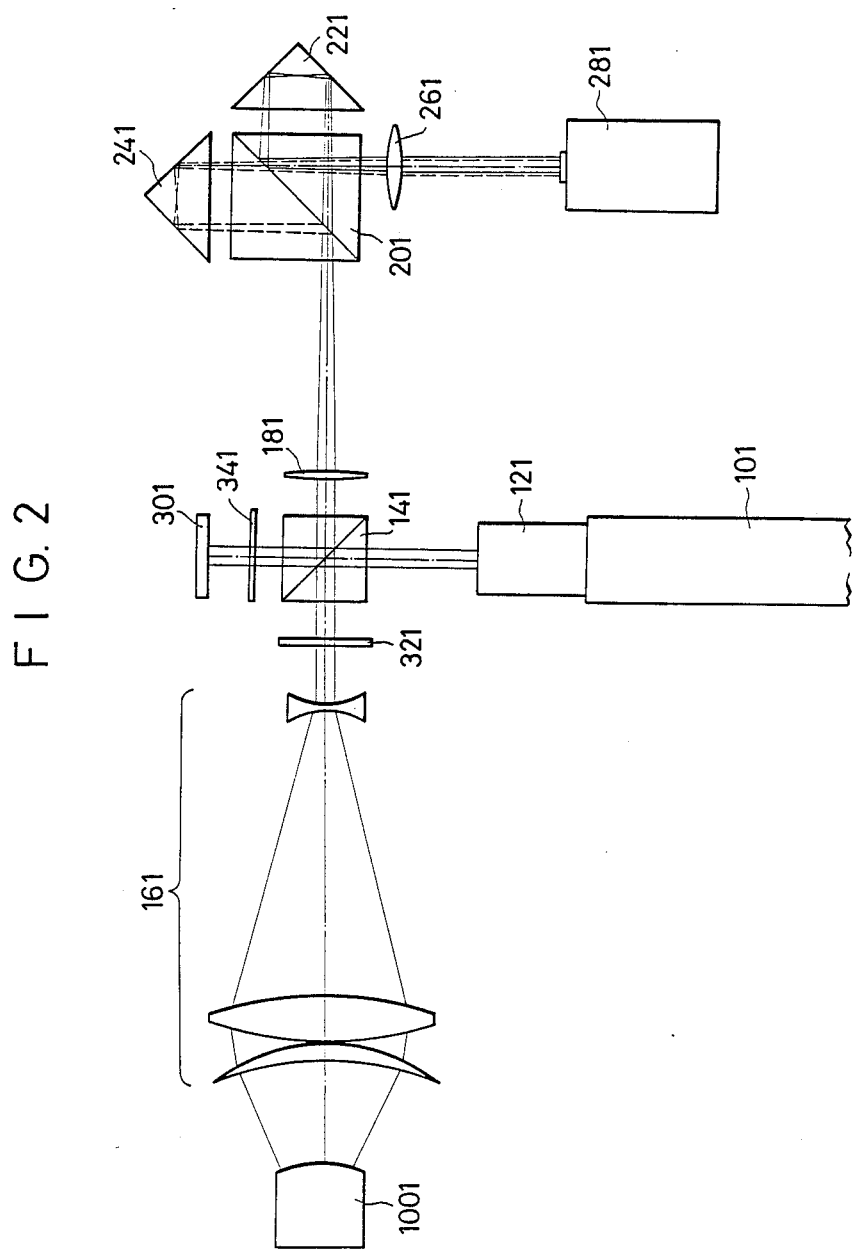
FIG. 2 is a schematic view of a shearing interferometric system for carring out a method of measuring the amount of a shear.

Referring now to the drawings, wherein like reference numerals designate identical or corresponding parts throughout the several views, and more particularly to FIG. 1 thereof, which shows a shearing interferometric system for carrying out a method of detecting the origin of a shear.

The shearing interferometric system includes a light source 10 comprising a laser beam source such as an He-Ne laser, a collimator lens 12, a beam splitter 14, a converter lens 16, a beam splitter 18, corner-cube prisms 20, 22 (hereinafter referred to simply as "prisms 20, 22"), an imaging lens 24, an area sensor 26, shutters 21, 23, a half-silvered mirror 25, a condenser lens 27, and a four-segment light detector 28.

The shearing interferometric system is employed for measuring the surface configuration of an object which is designated at 100 in FIG. 1(I).

The shutter 21 is disposed in the optical path of a basic light beam for opening and closing this optical path. The shutter 23 is disposed in the optical path of a reference light beam for opening and closing this optical path. The corner-cube prism 22 serves as a beam shearing member and is displaceable in x and y directions. When the corner-cube prism 22 is moved in the x direction, a shear is produced in the x direction, and when the corner-cube prism 22 is moved in the y direction (normal to the sheet of FIG. 1), a shear is produced in the y direction.

The basic and reference light beams travel parallel to each other between the beam splitter 18 and the imaging lens 24. These light beams are reflected by the half-silvered mirror 25 to fall on the condenser lens 27. The four-segment light detector 28 is displaced slightly along the optical axis from the convergent point of the condenser lens 27. Therefore, the light beams which impinge on the light detector 28 have a circular cross section.

As shown in FIG. 1(II), the light detector 28 has four light-detecting surfaces $\alpha, \beta, \gamma, \delta$ from which pective output signals $\alpha_1, \beta_1, \gamma_1, \delta_1$ can be produced. The output signals $\alpha_1, \beta_1$ are applied to an amplifier 30, which produces $(\alpha_1 - \beta_1)$ as amplified as an output signal $A_0$. The output signals $\gamma_1, \delta_1$ are applied to an amplifier 32, which produces $(\gamma_1 - \delta_1)$ as amplified as an output signal $B_0$. The output signals $A_0, B_0$ from the amplifiers 30, 32 are then applied to an amplifier 34, which produces $(A_0 - B_0)$ as amplified as an output signal $C_0$.

The origin of a shear is detected as follows: The light source 10 is energized, and the surface of the object 100 to be measured is moved to the convergent point of the light from the converter lens 16 which illuminates the object 100. At this time, the object 100 is positioned as indicated by the solid lines in FIG. 1(I). Measuring light, i.e., light reflected from the object 100 is passed through the converter lens 16, whereupon the light rays are parallel to each other. Then, the shutter 23 is closed to cut off the reference light beam, so that only the basic light beam falls on the light detector 28. While monitoring the output signal from the light detector 28, the light detector 28 is positioned by the operator so as to cause the basic light beam to hit the center of the light detector 28. To effect such a procedure, the position of the light detector 28 is adjusted so that all of the output signals $A_0, B_0, C_0$ will be zero. After the light detector 28 has positionally been adjusted, the shutter 21 is closed to cut off the basic light beam, and the shutter 23 is opened to allow only the reference light beam to fall on the light detector 28. The direction (the vertical direction in FIG. 1(II)) along which the light-detecting surfaces $\alpha, \beta$ are arranged is selected to be the y direction, and the direction (the horizontal direction in FIG. 1(II)) along which the light-detecting surfaces $\gamma, \delta$ are arranged is selected to be the x direction. Depending on the relative magnitudes of the output signals $A_0, B_0$, the direction of movement of the prism 22 is determined, and the prism 22 is so positioned that the output signals $A_0, B_0, C_0$ will substantially be eliminated. The prism 22 may be moved by a step motor or a DC motor with a feedback loop in order to eliminate the output signals $A_0, B_0, C_0$. In this manner, the optical axis of the basic light beam and the optical axis of the reference light beam are brought into conformity with each other through the light detector 28. The origin of a shear can be detected when the output signals $A_0, B_0, C_0$ is substantially zero.

Once the shear origin is detected, the object 100 is moved to a broken-line position in FIG. 1(I), and the shutters 21, 23 are opened. Then, the prism 22 is moved a prescribed shear in the x direction. Now, the procedure in preparation of a measurement process is completed.

The measurement process will be described below.

When the light source 10 is energized, the light emitted therefrom is converted by the collimator lens 12 to a parallel-ray light beam of a suitable diameter, which is reflected by the beam splitter 14 to travel to the left (FIG 1(I)). The light beam is then converted by the converter lens 16 to a convergent spherical wave that is applied to the object 100 and reflected thereby as measuring light. The measuring light bears information relative to the surface configuration of the object 100.

The measuring light passes through the converter lens 16 to the right and travels through the beam splitter 14 to the beam splitter 18. The beam splitter 18 divides the measuring light into a basic light beam (indicated by the solid lines) and a reference light beam (indicated by the broken lines). The basic light beam falls on and is reflected back by the prism 20, and is then reflected by the beam splitter 18 to travel in the z direction. The basic light beam then falls through the imaging lens 24 on the area sensor 26.

The reference light beam impinges on and is reflected back by the prism 22 to pass through the beam splitter 18 in the z direction and then through the imaging lens 24 to fall on the area sensor 26.

As shown in FIG. l(III), the reference light beam denoted A and the reference light beam denoted B overlap on the area sensor 26 as they are slightly shifted in the x direction, producing an interference fringe in the overlapped region.

The prism 20 is then displaced in the x direction to vary the length of the optical path of the basic light beam, whereupon the interference fringe on the area sensor 26 is varied. The variation in the interference fringe is read by the area sensor 26 to obtain data on the interference fringe, based on wihch a prescribed arithmetic operation is carried out to compute the wavefront shape of the basic light beam on the area, sensor 26. The wavefront shape thus computed is in a certain relationship to the surface configuration of the object 100. This relationship can be known in advance as it is governed by the optical system present between the object 100 and the area sensor 26.

The surface configuration of the object 100 can be determined by correcting the wavefront shape based on the aforesaid relationship. In an actual measurement process, a shear in the x direction is first produced to read interference fringe data in the x direction, and then a shear in the y direction (normal to the sheet of FIG. 1) is produced to read intereference fringe data in the y direction. The wavefront shapes computed from the data items thus read are combined to generate a threedimensional wavefront shape According to the shear origin detecting method of the invention, the origin of a shear is detected on the basis of the output signals from the four-segment light detector and hence can easily and reliably detected. The origin of a shear can be detected even automatically.

A method of measuring the amount of a shear will be described below.

FIG. 2 shows a shearing interferometric system for carrying out a method of measuring the amount of a shear. First, a process of measuring the surface configuration of an object 1001 will be described briefly, and a method of measuring the amount of a shear will be described.

The shearing interferometric system comprises a light source 101 comprising a laser beam source, a beam expander 121, beam splitters 141, 201, a converter lens 161, a relay lens 181, corner-cube prisms 221, 241, an imaging lens 261, and an area sensor 281. The corner-cube prisms will be referred to simply as "prisms" as with the preceding description.

An optical path for light to illuminate the object 1001 extends from the light source 101 through the beam splitter 141 and the converter lens 161 to the object 1001. An optical path for shearing interferometry extends leftwardly from the beam splitter 141. The shearing interferometric system also include also includes a plane mirror 301, a first shutter 321, and a second shutter 341. The beam splitter 141 serves as a member for dividing the optical paths.

For performing shearing interferometry, the shutter 321 is opened, the shutter 341 is closed, and the light source 101 is energized.

Light emitted from the light source 101 is spread by the beam expander 121 into a parallel-ray light beam (plane wave) of a larger diameter, which is reflected by the beam splitter 141 to travel leftwardly. The light beam is converged by the converter lens 161 into a convergent light beam (spherical wave) that falls on the object 1001.

Measuring light, i.e., light reflected from the object 1001 goes back through the converter lens 161, and travels via the beam splitter 141 and the relay lens 181 to fall on the beam splitter 201, which divides the measuring light into a basic light beam and a reference light beam.

The basic light beam falls on and is reflected back by the prism 221 to pass through the beam splitter 201 and the imaging lens 261 to the area sensor 281. The reference light beam falls on and is reflected back by the prism 241 to pass through the beam splitter 201 and the imaging lens 261 to the area sensor 281.

The prism 241 is displaced in a horizontal direction in FIG. 2 or in a direction normal to the sheet of FIG. 2 to laterally shift the reference light beam with respect to the basic light beam, whereupon an interference fringe appears on the area sensor 281. Then, the prism 221 is displaced by a PZT (not shown) to the right in FIG. 2 in slight N increments. The interference fringe pattern on the area sensor 281 is varied accordingly. The N different interference fringe patterns are read, and a prescribed arithmetic operation is effected on them to determine the wavefront shape of the basic light beam on the area sensor 281 (the fringe scanning interferometric process).

If the surface configuration of the object 1001 is a completely spherical surface and the illuminating light from the converter lens 161 converges toward the center of this spherical surface, the measuring light, i.e., the light reflected by the surface of the object 1001 is a divergent spherical wave, which will become a plane wave after it has passed rightwardly through the converter lens 161. At this time, each of the basic and reference light beams reaching the area sensor 281 in the optical system of FIG. 2 is of a plane wave.

If the surface configuration of the object 1001 is a non-spherical surface, each of the basic and reference light beams reaching the area sensor 281 has a curved wavefront shape, which represents a shift of the non-spherical surface from the spherical surface. Consequently, the configuration of the surface being measured can be determined by correcting the wavefront shape with the spherical surface. The fringe scanning interferometric process is performed both when the reference light beam is shifted by the prism 241 in the horizontal direction in FIG. 2 and when the reference light beam is shifted by the prism 241 in the direction normal to the sheet of FIG. 2, and a three-dimensional wavefront shape is derived from the data of both measurements.

The amount of light is adjusted by ND filters disposed between the beam expander 121 and the beam splitter 141 and also between the imaging lens 261 and the area sensor 281.

The shearing inteferometric process is effected as described above by the system shown in FIG. 2.

The measurement of the amount of a shear according to the present invention will hereinafter be described.

For measuring the amount of a shear, the shutter 321 is closed and the shutter 341 is opened to permit light that has passed through the beam splitter 141 to fall on the plane mirror 301. The light reflected by the plane mirror 301 is reflected to the right by the beam splitter 141 and guided as measuring light by the shearing interferometric optical path toward the area sensor 281.

The mirror surface of the plane mirror 301 is of a highly flat finish. Since the light impinging on the plane mirror 301 is composed of parallel light rays, the light reflected thereby, i.e., the measuring light is also composed of parallel light rays having a plane wave.

The measuring light passes through the relay lens 181 to the beam splitter 201 and is divided thereby into a basic light beam and a reference light beam, which are converged by the relay lens 181 in the prisms 221, 241, respectively. The convergent points of the light beams in the prisms 221, 241 are in conformity with the focal point of the imaging lens 261. Therefore, both light beams that emerge from the imaging lens 261 become plane waves falling on the area sensor 281.

Under this condition, the reference light beam is laterally shifted by the prism 241. Inasmuch as the optical axis of the basic light beam is aligned with the optical axis of the imaging lens 261, the wavefront of the basic light beam on the area sensor 281 becomes a plane S0 shown in FIG. 3(II). The optical axis of the reference light beam is parallel to the optical axis of the basic light beam immediately before the imaging lens 261. After having passed through the imaging lens 261, the optical axis of the reference light beam is inclined an angle $\theta$ to the optical axis of the imaging lens 261. Therefore, the wavefront of the reference light beam on the area sensor 281 becomes a plane S1 shown in FIG. 3(II). Since the wavefront of the plane wave lies perpendicularly to the optical axis of the light beam, the plane S1 is inclined the angle $\theta$ to the plane S0. The optical axis of the reference light beam passes through the focal point C of the imaging lens 261 on the image side. Accordingly, if the angle $\theta$ is known, the amount of a shear S can be known by:

$$S = f \cdot \tan \theta \qquad (2)$$

where f is the focal length of the imaging lens 261.

Figure 3:
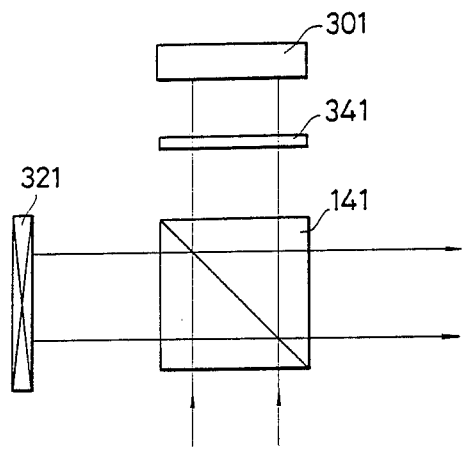
FIG. 3 is a schematic view showing the method of measuring the amount of a shear.
Figure 3:
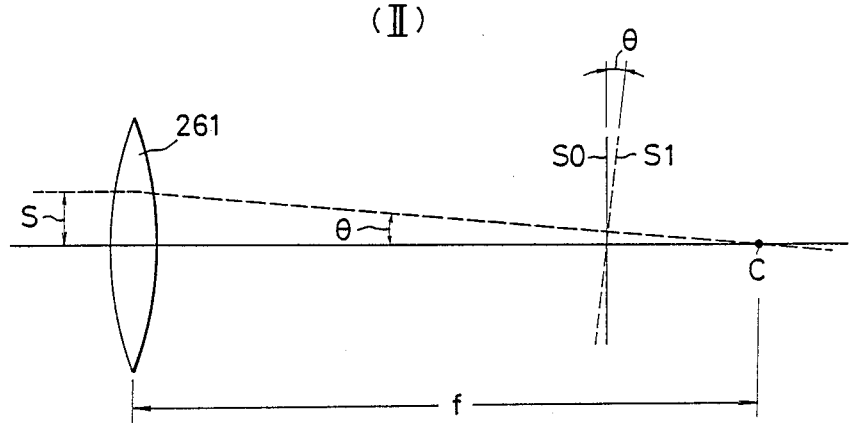
Figure 3:
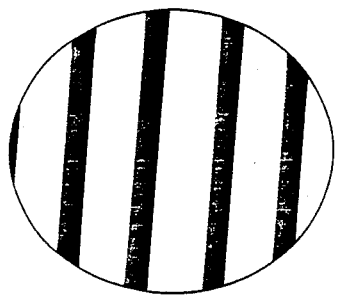

As each of the basic and reference light beams is of a plane wave having a plane wavefront, the interference fringe pattern on the area sensor 281 is composed of parallel stripes as shown in FIG. 3(III).

According to the fringe scanning interferometric process, the shape of the wavefront (the plane S1 of FIG. 3(II)) of the reference light beam can be determined. The wavefront of the basic light beam (the plane S0 of FIG. 3(II)) is assumed to lie in the xy plane, and the coefficents 1, m, n, P of the equation $1x + my + nZ + P = 0$ of the reference light beam wavefront S1 are determined so as to best fit the reference light beam wavefront according to the method of least squares, thereby finding an analytic expression of the plane S1. Using this analytic expression of the plane S1, the angle $\theta$ at which the basic light beam wavefront S0 and the reference light beam wavefront S1 are inclined to each other is analytically computed, and the amount of shear S is computed according to the equation (2) by using the computed angle $\theta$ and the focal length f which is known accurately.

The computation of the analytic expression of the plane S1 according to the method of least squares, the computation of the angle $\theta$, and the computation of the amount of shear S according to the equation (2) can all be carried out by a processing means such as a microcomputer which effects arithmetic operations for fringe scanning interferometric measurements. According to this method of measuring the amount of a shear, the amount of a shear can accurately be determined, and hence the accuracy of shearing interferometric measurements can effectively be increased.

According to an experiment, the accuracy at which the angle is repeatedly measured was within $\pm 0.3$ second. Therefore, where a lens having a focal length $f = 60$ is used as the imaging lens 26, the accuracy at which the shear amount S is measured is highly increased, i.e., it is held within $\pm 0.102$ micrometer.

In the aforesaid shearing interferometry, fringe scanning is performed for the analysis of interference fringes. Therefore, the foregoing shearing interferometric process should be classified as the fringe scanning interferometric process.

In the fringe scanning interferometric process, the basic and reference light beams are caused to interfere with each other on the area sensor and the phase of the reference or basic light beam is varied in N increments. Then, the interference fringe pattern in each of the N increments is read, and the arithmetic operation is effected on the obtained data to determine the wavefront shape $W(x, y)$ of the basic light beam:

$$W(x, y) = \frac{1}{2k} \tan^{-1} \frac{\frac{2}{N} \sum_{j=1}^{N} I_j(x, y) \sin 2kl_j}{\frac{2}{N} \sum_{j=1}^{N} I_j(x, y) \cos 2kl_j} \qquad (3)$$

where $I_j(x,y)$ is a light intensity at the (x,y) position of the interference fringe pattern in the jth phase variation, k is a so-called wave number given as $2\pi/\lambda$ with $\lambda$ being the wavelength of light, and $l_j = j\lambda/2N$ which is the extent of the jth phase variation.

Figure 4:
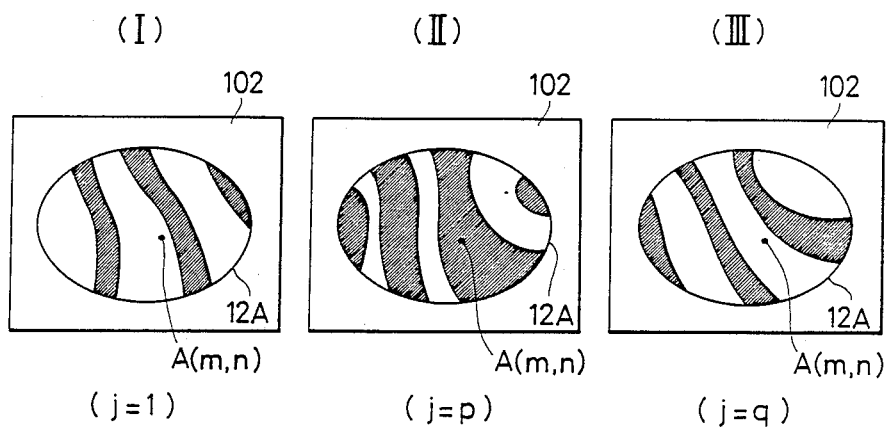
FIGS. 4 through 7 are views showing the manner in which an interference region and a background region are discriminated from each other.

The region in which the basic and reference light beams interfere with each other is generally elliptical or circular as shown in FIG. 4(I). Designated in FIG. 4 at 102 is a zone in which the area sensor detects light, and 12A a region in which the basic and reference light beams interfere with each other. The region lying within the light-detecting zone 102 of the area sensor and without the interference region 12A will be called a background region, and the region within the interference region 12A will be called a signal region.

Information required to determine the wavefront shape of the basic light beam can be obtained from the signal region. Since the arithmetic operation (3) is automatically effected on the output from the area sensor, a signal from the background region would be included in the arithmetic operation (3) unless some preventive measures were taken. It is known that a noise signal is highly likely to be produced in the background region. Thus, if such a noise signal were included in the arithmetic operation (3), the result of measurement would be adversely affected thereby.

Figure 5:
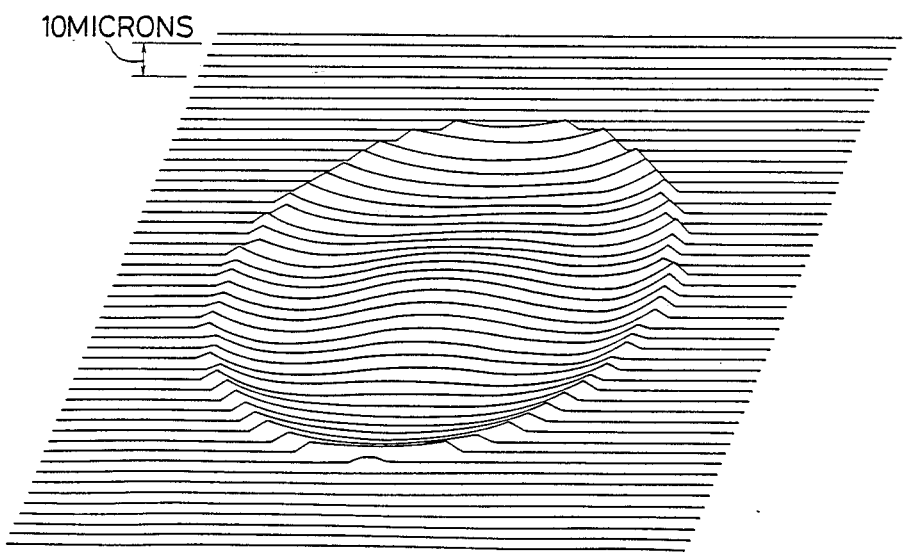
Figure 6:
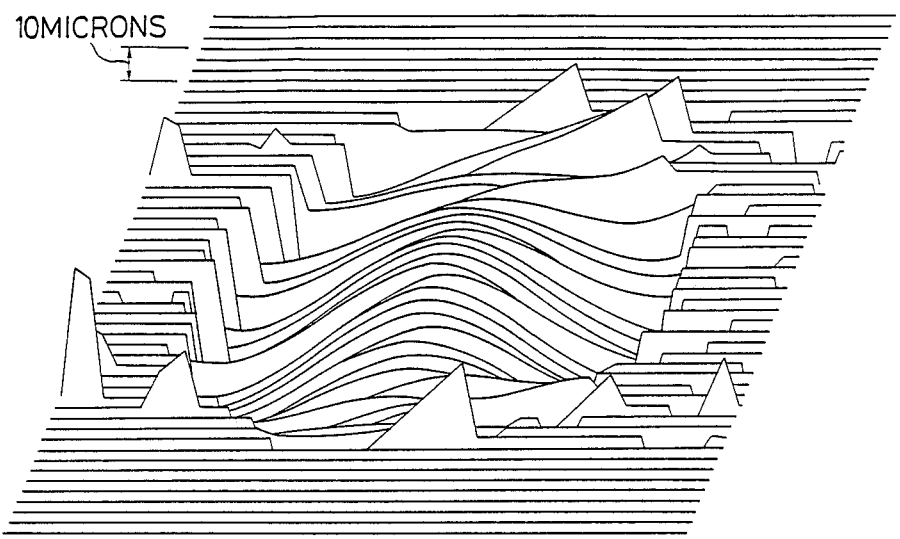

As an example, FIG. 5 shows a measurement result obtained of an object when a good measurement is effected by the fringe scanning interferometric process. When a noise signal from the background region is included, however, the measurement result is as shown in FIG. 6, so that the measurement accuracy is largely reduced and no measurement reliability is assured.

Consequently, the fringe scanning interferometric process must separate the background region from the signal region in order to prevent a signal from the background region from being included in the arithmetic operation (3).

One way of meeting the above requirement would be to use a mask. However, with the mask used, the background and signal regions could not be well separated from each other if the optical axis of the optical system for leading the basic and reference light beams to the area sensor were subject to an error. In addition, the mask size has to be changed each time the size of the signal region is varied to measure a different object.

The background region can be identified without using any mask in the following manner: An identification value T is computed for each light-detecting element of the area sensor based on two or more interference fringe patterns read as the phase of the basic or reference light beam is changed. The identification value T is compared with a discrimination value K for each of the light-detecting elements of the area sensor, the discrimination value K being experimentally known in advance.

The values K and T are compared for magnitude. Those light-detecting elements for which K > T are judged as lying in the background region, and those light-detecting elements for which K ≦ T are judged as lying in the signal region. The identification process will be described below in more detail.

The vertical direction in FIG. 4 is assumed to be the x direction, whereas the horizontal direction is assumed to be the y direction. The light-detecting zone 102 of the area sensor includes a two-dimensional array of small light-detecting elements which are arranged as follows:

$N_0$ light-detecting elements are arrayed in the y direction in the light-detecting zone 102 of the area sensor, whereas $M_0$ light-detecting elements are arrayed in the x direction. Therefore, $M_0 \times N_0$ light-detecting elements are disposed as $M_0$ rows and $N_0$ columns in the light-detecting zone 102, the light-detecting elements being spaced at a pitch of d in each of the x and y directions.

Now, a light-detecting element A(m, n) in the mth row and nth column will be considered. This light-detecting element A(m, n) has x and y coordinates: x=md and y=nd, for example.

The light intensity has been expressed by I in the above description. The output from a light-detecting element which has detected the light intensity I will also be expressed by I below. For example, if the light-detecting element A(m, n) detects light having an intensity $I_j(m, n)$ in an interference fringe pattern at the jth phase variation, the output from the light-detecting element A(m, n) is also expressed by $I_j(m, n)$.

The question here is how to ascertain whether the light-detecting element A(m, n) is in the background region or the signal region. In FIG. 4, the light-detecting element A(m, n) is shown to be in the signal region.

The basic light beam and the reference light beam are caused to interfere with each other, and the length of the optical path of the basic or reference light beam is varied to change the phase. At this time, the phase difference between the wavefront of the basic light beam and the wavefront of the reference light beam varies at each point in the interference region, and so does the interference fringe pattern.

Figure 7:
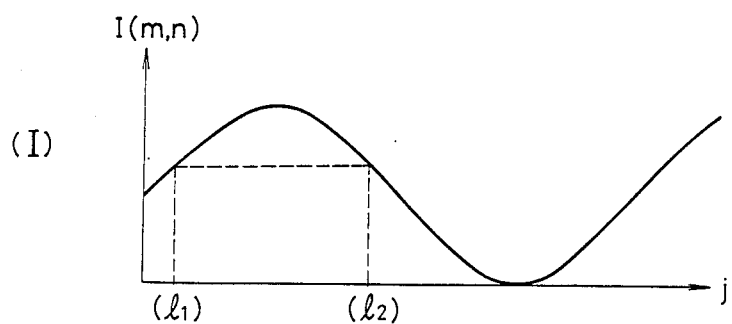
Figure 7:
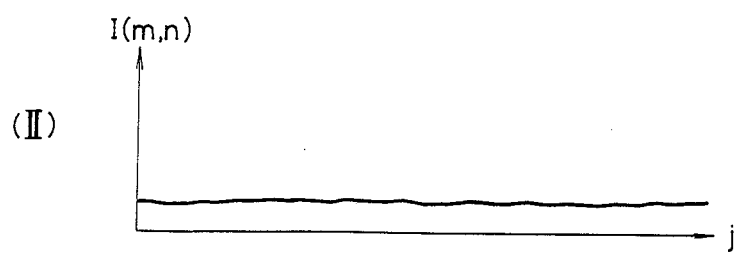

The interference fringe pattern shown in FIG 4(I) is produced when j=1, i.e., the phase is varied at the first stage. The interference fringe pattern shown in FIG. 4(II) is produced when j=p (p>1), i.e, the phase is varied at the pth stage. The interference fringe pattern shown in FIG. 4(III) is produced when j=q (q>p), i.e, the phase is varied at the qth stage. If the light-detecting element A(m, n) is in the signal region as shown, the output I(m, n) from this light-detecting element A(m, ) will vary along a sine curve as shown in FIG. 7(I) as the phase variation stage j is changed. The output I always varies along a sine curve as j is changed insofar as the light-detecting element A(m, n) lies in the signal region. Since this output change is caused by the phase variation in the interference region, almost no change in the output I(m, n) dependent on j is experienced and the value of I(m, n) is small, as shown in FIG. 7(II), in the background region in which no phase variation takes place.

Therefore, if it is known that the output of a certain light-detecting element does not substantially vary as shown in FIG. 7(II) or varies along a sine curve when the phase is changed, then it can easily be identified whether such a light-detecting element is in the signal region or the background region.

According to the present identification process, the region in which a light-detecting element is present is identified by comparing an identification value T and a discrimination value K for magnitude. The identification value T may be any parameter as far as it can discriminate the patterns of FIGS. 7(I) and 7(II) from each other. Three types of the identification value T will be given below for example.

The first identification value T is expressed by: $T = C^2 + S_2$. For a light-detecting element A(m, n) (m=11 through $M_0$, n=1through $N_0$, the identification value is given by:

$$T(m, n) = C^2(m, n) + S^2(m, n) \qquad , (4)$$ where $$C(m, n) = \frac{2}{N} \sum_{j=1}^{N} I(x, y, l_j) \cos \frac{2\pi}{N} j \qquad (5)$$

$$S(m, n) = \frac{2}{N} \sum_{j=1}^{N} I(x, y, l_j) \sin \frac{2\pi}{N} j$$

In these equations (5), the parameter j indicative of the phase variation stage is used as a variable $l_j$ instead of $I_j(x, y)$, $l_j$ being expressed by $l_j = j \lambda/2N$.

When the light-detecting element A(m, n) is in the signal region, T(m, n) is significantly large (its value is expressed as $T_S$). When the light-detecting element A(m, n) is in the background region, T(m, n) is significantly small (its value is expressed as $T_B$). Now, the discrimination value K ($T_S > K > T_B$) is compared with T(m, n) for each light-detecting element. Then, those light-detecting elments for which T > K are in the signal region, and those light-detecting elements for which T < K are in the background region. Since the light-detecting elements that are present in the background region can easily be identified in the above manner, it is possible to preclude the outputs of the light-detecting elements in the background region from the arithmetic operation (3).

When the above first identification value T was used and the signal was a 8-bit signal, it was better to use 100 as the value K.

The second identification value T is defined as:

$$T(m, n) = |I(m, n, l_1) - I(m, n, l_2)| \quad (6)$$

where $l_1$ is one of $l_j$ (j=1 through N), and $l_2$ is $l_1 + \pi/2$. Therefore, the phase of the reference light beam for I(m, n, $l_2$) is shifted $\pi/2$ with respect to that for I(m, n, $l_1$).

The identification value T(m, n) can be computed by using only two interference fringe patterns which are shifted in phase by $\pi/2$, out of N interference fringe patterns that are read as the phase is varied. Thus, the arithmetic operation required to compute the identification value T(m, n) is much simpler than that used for computing the first identification value.

Where $l_1$ and $l_2$ are related to each other as shown in FIG. 7(I), the identification value T for this light-detecting element is 0, and the light-detecting element is judged as lying in the background region while in fact it is in the signal region, resulting in a discrimination error. To eliminate such a discrimination error and allow for a simpler identification, the following third identification value may be used:

The third identification value is defined as follows:

$$T(m, n) = |I(m, n, l_1) - I(m, n, l_2)| + |I(m, n, l_1) - I(m, n, l_3)| \quad (7)$$

where $l_2 = l_1 + \pi/2$, $l_3 = l_1 + \pi$.

With the third identification value, three interference fringe patterns that are shifted in phase by $\pi/2$ with respect to each other, out of all interference fringe patterns read as the phase is varied, are used. Therefore, T(m, n) is greater than 0 at all times for those light-detecting elements lying in the signal region, and T(m, n) $\simeq$ 0 or those light-detecting elements in the background region. A value slightly larger than 0 may be used as K as with the second identification value.

Figure 8:
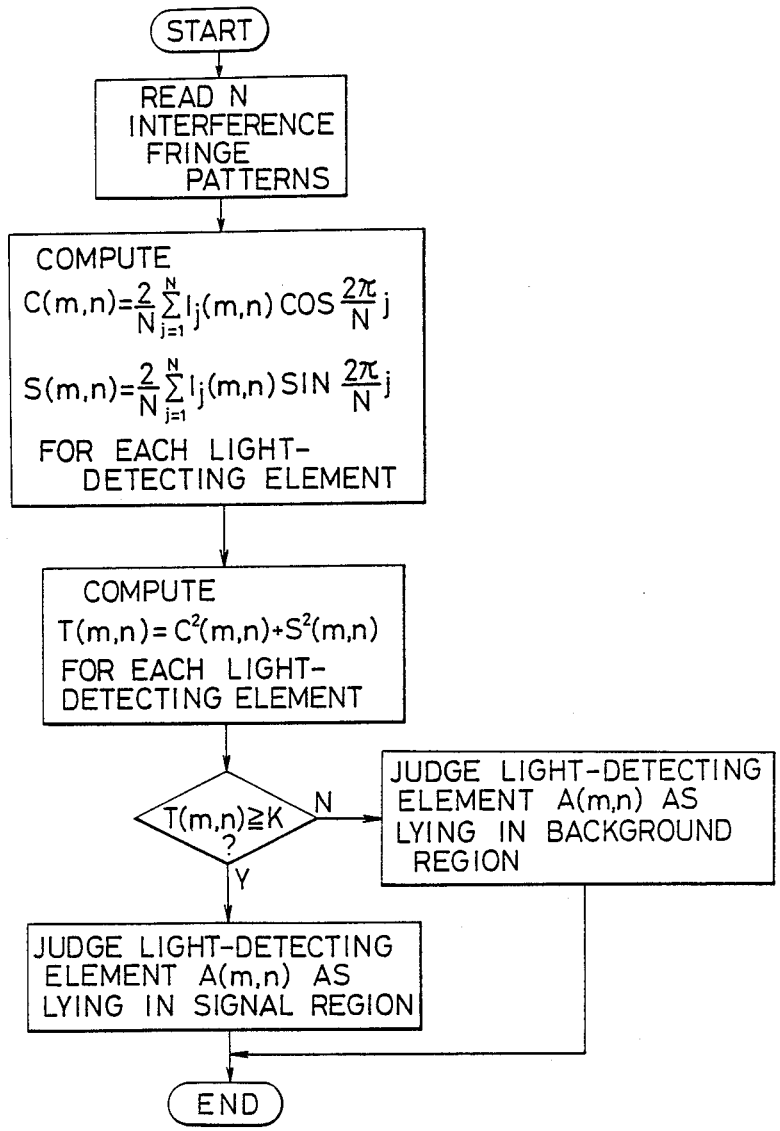
FIG. 8 is a flowchart of operation for discriminating the interference and background regions from each other.

FIG. 8 shows a flowchart of a process for identifying the background region when the first identification value defined by the equation (4) is used.

The process of identifying the background region can be used not only for the shearing interferometric system, but also for general interferometric systems employing fringe scanning, such as a Twyman-Green interferometric system in which a basic or test light beam and a reference light beam reflected from a reference surface are caused to interfere with each other.

Although a certain preferred embodiment has been shown and described, it should be understood that many changes and modifications may be made therein without departing from the scope of the appended claims.

What is claimed as new and desired to be secured by Letters Patent of the United States:

1. A method of detecting the origin of a shear of a reference light beam from a basic light beam in a shearing interferometric system, said system comprising shutters, a condenser lens, a four-segment light detector, and a shearing member, comprising the steps of:
    placing said shutters respectively in optical paths of the basic and reference light beams;
    converging the basic and reference light beams that have traveled parallel to each other toward a convergent point with said condenser lens;
    placing said four-segment light detector in a position slightly displaced from said convergent point in the direction of the optical axis;
    closing the optical path of the reference light beam with the shutter disposed therein to allow only the basic light beam to fall on said light detector;
    displacing said light detector while monitoring output signals from the light detector until the light detector is positioned so that said basic light beam falls on the center of the light detector;
    then closing the optical path of the basic light beam with the shutter disposed therein and opening the optical path of the reference light beam to allow only the reference light beam to fall on said light detector; and
    displacing said shearing member which shears the reference light beam while monitoring the output signals from the light detector unit said reference light beam falls on the center of the light detector.

2. A method of measuring the amount of shear between a basic light beam and a reference light beam in a shearing interferometric system for measuring the surface configuration of an object, said system comprising a converter lens, a plane mirror, a first and second shutter, an area sensor, and an imaging lens, comprising the steps of:
    illuminating the object with illuminating light of parallel light rays has passed through said converter lens along an illuminating optical path;
    directing a portion of the illuminating light from a separation point before said converter lens to fall on said plane mirror;
    placing said first shutter between said separation point and said converter lens and said second shutter between said separation point and said plane mirror;
    closing said first shutter and opening said second shutter to allow parallel-ray light to fall on said plane mirror;
    guiding light reflected from said plane mirror as measuring light along a shearing interferometric optical path to said area sensor;
    dividing the measuring light into said basic light beam and said reference light beam before reaching said area sensor;
    laterally shifting said reference light beam with respect to said basic light beam;
    measuring an interference fringe pattern on said area sensor by a fringe scanning process to determine an angle $\theta$ by which the wavefront of the basic light beam and the wavefront of the reference light beam are inclined to each other; and
    computing the amount of a shear S according to S = f·tan $\theta$ where f is the focal length of said imaging lens which causes the light beams to fall on said area sensor.

3. An apparatus for detecting the origin of a shear of a reference light beam from a basic light beam in a shearing interferometric system, comprising:

light beam means for producing a basic light beam and a reference light beam;

first and second shutters located respectively in the paths of the basic and reference light beams for selectively blocking the respective light beams;

condenser lens for converging the basic and reference light beams toward a convergent point;

a four segment light detector located in a position slightly displaced from the convergent point in the direction of the optical axis;

switching means for selectively activating the first and second shutters so that only one of the basic and reference light beams fall on the light detector at a time;

means for displacing the light detector so as to position the light detector so that the basic light beam falls on the center of the light detector.

4. An apparatus for detecting according to claim 3, further comprising a shearing member which shears the reference light beam; and means for displacing said shearing member;

wherein said means for displacing said shearing member moves said shearing member while the output signals from the light detector are monitored until the reference light beam falls on the center of the light detector.

5. An apparatus for measuring the amount of shear between a basic light beam and a reference light beam in a shearing interferometric system for measuring the surface configuration of an object, comprising:

a light source for producing a light beam;

separating means for dividing said light beam into a first light beam and a second light beam;

a converter lens for illuminating the object with parallel light rays from said first light beam;

a first shutter between said separating means and said converter lens;

a plane mirror for receiving said second light beam from said separating means;

a second shutter between said separating means and said plane mirror;

switch means for selectively opening and closing said first and second shutters;

means for directing light which is reflecting from said object from said first beam and light which is reflected from said plane mirror from said second light beam along a shearing interferometric optical path;

means for dividing light from said means for directing light into a basic light beam and a reference light beam;

an area sensor for receiving said basic light beam and said reference light beam;

means for laterally shifting the reference light beam with respect to the basic light beam;

means for measuring the interference fringe pattern on said area sensor to determine an angle $\theta$ between the basic light beam and the reference light beam; and means for computing the amount of shear.

6. A method of detecting the origin of a shear of a reference light beam from a basic light beam in a shearing interferometric system, said system comprising a light detector and a shearing member, comprising the steps of:

removing the reference light beam so that only the basic light beam falls on said light detector;

displacing the light detector unit the basic light beam falls on the center of the light detector;

removing the basic light beam and reinstating the reference light beam so that only the reference light beam falls on the light detector; and displacing said shearing member until the reference light beam falls on the cetner of the light detector.

7. A method of measuring the amount of shear between a basic light beam and a reference light beam in a shearing interferometric system for measuring the surface configuration of an object, said system comprising a plane mirror and an area sensor, comprising the steps of:

dividing a light beam with the resultant beams illuminating the object and said plane mirror;

directing the reflected light from said object and said plane mirror along a shearing interferometric optical path;

dividing the light into said basic light beam and said reference light beam;

laterally shifting the reference light beam with respect to the basic light beam;

measuring an interference fringe pattern on said area sensor to determine the angle between the basic light beam and the reference light beam; and computing the amount of shear according to this measured angle.

* * * * *

UNITED STATES PATENT AND TRADEMARK OFFICE
CERTIFICATE OF CORRECTION

PATENT NO. : 4,743,118

DATED : May 10, 1988

INVENTOR(S) : Keishin Tsuchiya, et al.

It is certified that error appears in the above-identified patent and that said Letters Patent is hereby corrected as shown below:

Title page:

The first entry under [30] Foreign Application Priority Data should be corrected as follows:

-- Apr. 4, 1985 [JP] Japan ............ 60-071820 --

Signed and Sealed this

Twentieth Day of September, 1988

Attest:

DONALD J. QUIGG

Attesting Officer

Commissioner of Patents and Trademarks